Jan. 4, 1938. N. J. GONDOLF 2,104,640
FAUCET
Filed Nov. 3, 1936
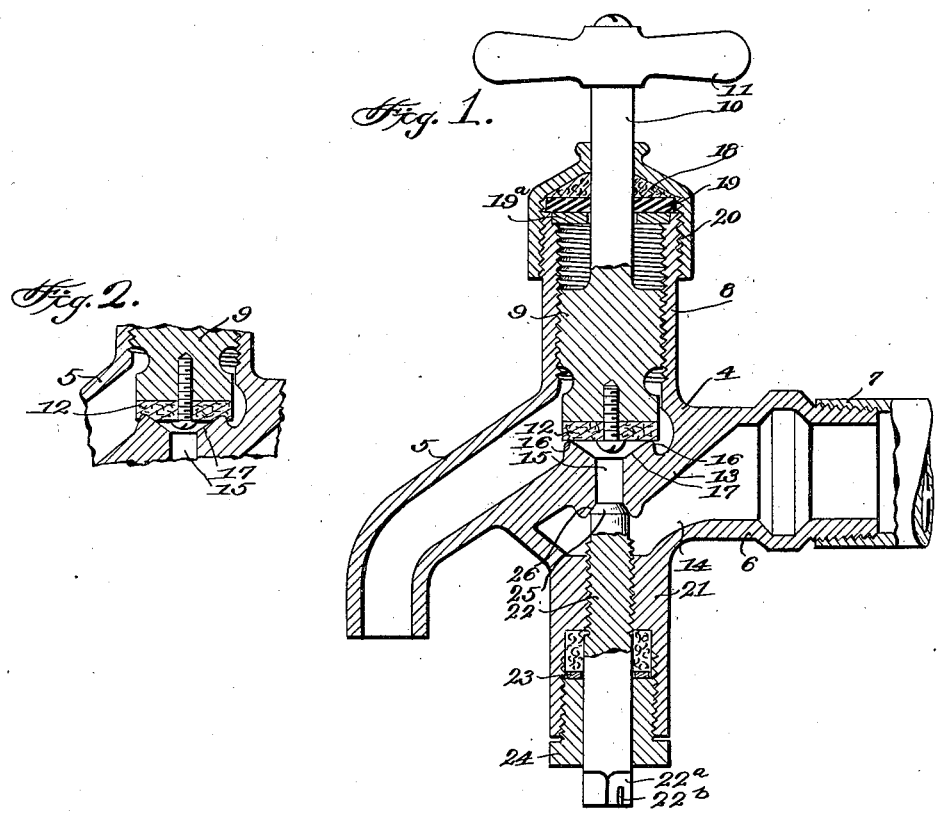
Inventor
Nicholas J. Gondolf
By Munn Anderson & Liddy
Attorneys Patented Jan. 4, 1938

2,104,640

UNITED STATES PATENT OFFICE 2,104,640

FAUCET

Nicholas J. Gondolf, New Orleans, La.

Application November 3, 1936, Serial No. 109,020

1 Claim. (Cl. 277—67)

My invention relates to improvements in faucets, and it consists in the constructions, combinations, and arrangements herein described and claimed.

The invention is particularly directed to that type of faucet in which auxiliary means is provided for cutting off the flow of water so as to permit the removal of the washer, such as a fiber washer, and the replacement of a new washer, without the necessity of manipulating other cutoffs which are generally located some distance away.

An object of the invention is to provide a simple device which is easily accessible and which will act to positively cut off all flow so as to permit the removal and replacement of the washer on the main valve stem.

A further object of the invention is to provide valve seats which will not cut the washer on the main valve stem but which will permit the washer to make a more effective closure the longer the washer wears and the tighter it is screwed down on the valve seat.

A further object of the invention is to provide a device of the type described which can be manipulated by a simple tool, such as a screw driver, a wrench, or the like.

A still further object of the invention is to provide a faucet construction which is applicable to the ordinary compression bibb and to such forms of faucets as the upright basin cock.

Other objects and advantages will appear in the following specification and the novel features of the invention as will be particularly pointed out in the appended claim.

My invention is illustrated in the accompanying drawing, in which:—

Figure 1 is a vertical sectional view through a compression bibb containing one embodiment of my invention, Figure 2 is a fragmentary sectional view through a washer showing the latter compressed on its seat.

Referring now particularly to Fig. 1 I have shown therein a faucet comprising a body portion 4 having a spout 5. An extension 6, which is threaded to engage a water pipe 7, constitutes an inlet. An extension 8 which is threaded internally receives the main valve 9 which is controlled by a valve stem 10 and a handle 11. The valve 9 is provided with a washer 12 of fiber, rubber, or other suitable material. A partition 13 separates the water chamber 14 from the spout 5. This partition is provided with a passageway 15. The upper end of this passageway 15 is controlled by the valve 9 and washer 12. It will be noted that the valve seat has an annular ridge 16 against which the washer 12 can bear, and it also has a tapered portion 17 adjacent to the ridge 16 which acts as an extension of the valve seat, as the valve is screwed downwardly. When the washer 12 begins to wear or is forced tightly against its seat, it will be observed that a greater bearing surface comes into play, part of this bearing surface being the seat 17, as shown in Fig. 2. Thus the more the washer wears the greater the bearing surface and the less the chance for leakage.

The upper part of the extension 8 has a packing gland 18 with the usual rubber washer 19, supported by the metal washer 19a, and screw cap 20 for compressing the gland to prevent any leakage.

On the bottom of the faucet is an extension 21 which is threaded internally to receive the threaded portion of a valve stem 22. The outer end of this valve stem is preferably squared as shown at 22a so that it can be turned by a wrench and the end is provided with a kerf 22b so that it can be manipulated by a screw driver. A packing gland and washer 23 is provided which is compressed by a threaded compression member 24 so as to prevent leakage.

The auxiliary valve 25 is formed by beveling the end of the valve stem 22 and this valve seats on a machine and tapered surface 26 so as to make a tight closure.

From the foregoing description of the various parts of the device the operation thereof may be readily understood. Normally the valve stem 22 is unscrewed so as to permit a free flow of water from the chamber 14 to the passageway 15. Normally also the washer 12 is screwed down on its seat to shut off the water. By manipulating the handle 11 the valve may be withdrawn so as to permit the water to flow from the pipe 7 through the chamber 14 and passageway 15 and the nozzle in its discharge.

When the washer becomes worn, all that it is needed to do to change it, is to turn the valve stem 22 so as to bring the valve 25 in contact with its seat, thus closing the passageway 15 and permitting the cap 20 and the valve 9 to be removed. When the washer is replaced and the parts are again brought into position, as shown in Fig. 1, the valve stem 22 can be retracted, thus permitting the water to again have access to the passageway 15 which is of course controlled by the handle 11 and valve 9 in the usual manner.

It is not necessary to leave the faucet to effect the removal and replacement of the washer 12 of the device and there is no leakage while this is being done, since the machined surfaces of the auxiliary valve and its seat tend to effect a complete closure when the valve is on its seat.

I claim:

A faucet comprising a water chamber having an inlet, an inclined spout, a partition having a thickened intermediate portion and an auxiliary vertical chamber of greater length than its width in the thickened portion, the partition being inclined at an angle to the horizontal and forming part of the inclined wall of said spout, said auxiliary chamber forming a communication between the water chamber and the spout, a main valve seat on the inclined partition at the upper end of the auxiliary chamber, a main valve controlling the flow of water from the auxiliary chamber to the spout, a valve seat ground in partition at the lower end of the auxiliary chamber, an auxiliary valve engaging the auxiliary seat for cutting off water from the water chamber to the auxiliary chamber, the upper end of said auxiliary chamber being flared.

NICHOLAS J. GONDOLF.